W. ONIONS.
NUT-LOCK.

No. 174,560. Patented March 7, 1876.

Witnesses.
J. W. Herthel.
Chas. F. Meisner.

Inventor:
William Onions
per Herthel & Co.

UNITED STATES PATENT OFFICE.

WILLIAM ONIONS, OF ST. LOUIS, MISSOURI.

IMPROVEMENT IN NUT-LOCKS.

Specification forming part of Letters Patent No. 174,560, dated March 7, 1876; application filed January 26, 1876.

*To all whom it may concern:*

Be it known that I, WILLIAM ONIONS, of St. Louis, Missouri, have invented an Improved Nut-Lock, of which the following is a specification:

This invention is chiefly designed as a nut-lock, for completing the fastening of rail ends.

This invention consists in improved construction of a fastening plate and nut, with relation to each other, and their combination with an ordinary bolt, to form a lock-nut, as will now more fully appear.

Figure 1:
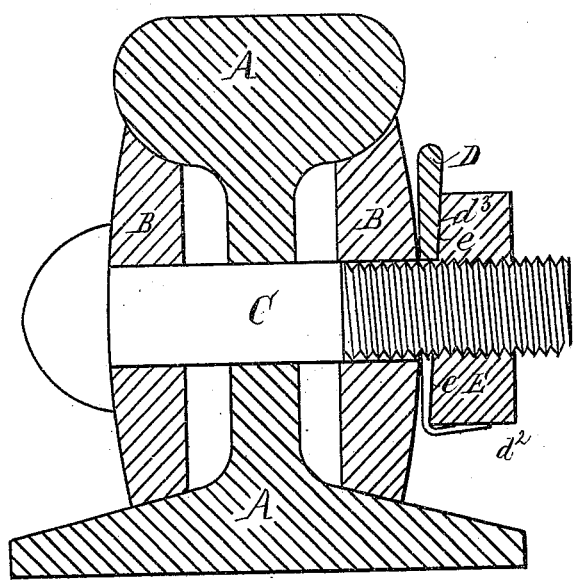
Figure 2:
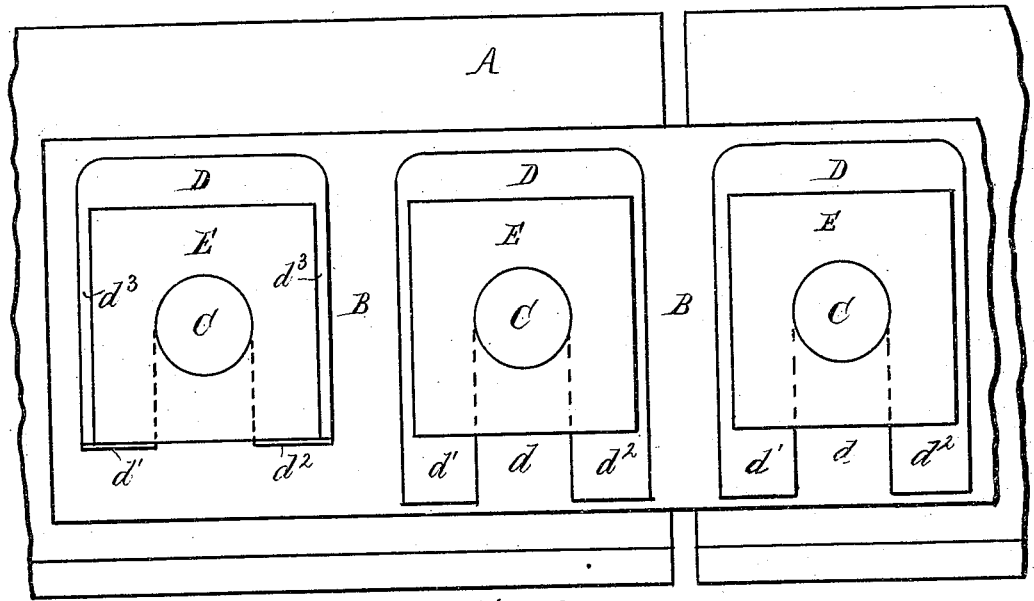

Of the drawing, Figure 1 is a cross-section of a rail end on line with the bolt and nut, showing my improved nut-lock. Fig. 2 is a side elevation of Fig. 1.

A is the rail. B are the fish-bars, with the bolt C passing through, as ordinary. D is my improved fastening-plate or washer. This I form to have a slot, $d$, forming prongs $d^1$ $d^2$. (See Fig. 2.) The slot $d$ permits the fastening-plate to be placed over and around the bolt C, as shown in the drawing, after the nut has been screwed up. Further, I form the fastening-plate D so that its side $d^3$ presents the tapered surface shown in Fig. 1; and hence said plate, like a wedge, can be driven in between the fish-bar and nut, and the more it is forced down the tighter the nut can be locked.

E is the nut. This I taper also on its face $e$, contiguous to the fastening-plate, the bevel on the nut corresponding to that of the plate, in manner shown in Fig. 1.

The parts being thus constructed with relation to each other, their manner of use and operation is as follows: The bolt C is inserted through the rail and fish-bars, as usual. Next, I secure the nut, with its bevel face first. This nut should be screwed sufficiently in position so that its incline shall be from top to bottom, and as contiguous to the fish-bar as will enable the fastening-plate to be forced completely down between fish-bar and bolt, in manner indicated in figures. In case the incline position of the nut is reversed, or the same cannot be brought at first in the right position on the bolt, and otherwise to adapt the nut and fastening-plate on the bolt to achieve the desired locking end, it is but necessary to screw the nut back far enough to allow the bolt to be turned half-way in either direction. This done, it will be found that the nut will assume the position required to effect the complete fastening when the wedge is inserted and forced to its seat. The nut therefore screwed in place, the fastening-plate is lastly inserted from the top, with its prongs between the nut and fish-bar, and driven down in position indicated in the figures. The fastening-plate thus wedged in between the nut and fish-bar, it is apparent the incline faces prevent the self-disengagement of the parts or the nut from turning in either direction, and thus the "lock" is accomplished.

The pronged ends of the fastening-plate are bent over the flange of the rail, or round the under face of the nut—a feature which can be readily done, and which still more effectually prevents the plate from being loosened.

My invention is simple, most practicable, and easily applied, since it is but necessary to substitute in place of the ordinary nut my improved fastening-plate and nut on the old bolt used.

What I claim is—

A nut-lock, consisting of a fastening-plate, D, having a slot, $d$, and bevel face $d^3$, the nut E having bevel face $e$, in combination with a bolt, C, to operate as and for the purposes set forth.

In testimony of said invention I have hereunto set my hand.

WILLIAM ONIONS.

Witnesses:
WILLIAM W. HERTHEL,
CHAS. F. MEISNER.